PIN REGISTRATION BOARD AND METHOD

Filed Nov. 13, 1961 4 Sheets-Sheet 1

INVENTOR.
Harold H. Alldis
BY Flehr and Swain
Attorneys

Aug. 2, 1966 H. H. ALLDIS 3,264,106

PIN REGISTRATION BOARD AND METHOD

Filed Nov. 13, 1961 4 Sheets-Sheet 2

INVENTOR.
Harold H. Alldis
BY Fleh and Swain
Attorneys

Aug. 2, 1966 H. H. ALLDIS 3,264,106

PIN REGISTRATION BOARD AND METHOD

Filed Nov. 13, 1961 4 Sheets-Sheet 3

INVENTOR.
Harold H. Alldis
BY Fleher and Swain
Attorneys

Aug. 2, 1966 H. H. ALLDIS 3,264,106

PIN REGISTRATION BOARD AND METHOD

Filed Nov. 13, 1961 4 Sheets-Sheet 4

INVENTOR.
Harold H. Alldis
BY Fisher and Swain
Attorneys

United States Patent Office 3,264,106

Patented August 2, 1966

3,264,106

PIN REGISTRATION BOARD AND METHOD

Harold H. Alldis, 3066 Stelling Drive, Palo Alto, Calif.

Filed Nov. 13, 1961, Ser. No. 151,839

4 Claims. (Cl. 96—41)

This invention relates to a pin registration board and method and more particularly to a pin registration board and method for use in the graphic arts industry.

In the graphic arts industry, there is a need for a mechanical registration system which can be used by the artist in preparing mechanical and art layouts with overlap, and also by the stripper, the cameraman and the plate maker for maintaining constant registration of the various elements making up what is called a flat during the entire process of stripping and exposing the final plate. There is particularly a need for such mechanical registration to reduce or eliminate dependence upon visual registration and to reduce the time required in making flats for two or more colors, to make exacting multiple exposures or combination burns and to prepare for and to execute with ease a flat for close step-and-repeat work. Although step boards or registration boards with registration pins have heretofore been provided for such work to a limited degree, they have not fulfilled the need for a complete and flexible system for coordinating all phases of the work—art, camera, stripping and plate making. One of the primary difficulties has been the fact that such boards have not been transparent. Because they have not been transparent, they cannot be used efficiently on a light table. Such boards have also been unsatisfactory and limited in use because of the manner in which the registration pins were positioned on the registration board and in the manner in which step distances were controlled.

In general, it is an object of the present invention to provide a pin registration board and method that is complete and flexible and which is particularly adapted for use in the graphic arts industry and which also makes possible precision mechanical registration.

Another object of the present invention is to provide a pin registration board and method of the above character which is particularly useful in the stripping and plate making departments of a graphic arts establishment.

Another object of the invention is to provide a pin registration board and method of the above character which can be used over a light table and in a vacuum frame.

Another object of the invention is to provide a pin registration board and method of the above character which can be used for making plates of all sizes.

Another object of the invention is to provide a pin registration board and method of the above character which makes it relatively easy to obtain perfect registration to thereby facilitate the work of making flats for two or more colors, making exacting and multiple exposures or combination burns, and for making step-and-repeats.

Another object of the invention is to provide a pin registration board and method of the above character which simplifies the placement of pins and which at the same time permits an almost infinite variation in the distances between steps and the number of steps.

Another object of the invention is to provide a pin registration board and method of the above character which is relatively inexpensive and which can be readily replaced.

Additional objects and features of the invention will appear from the following description in which the preferred embodiments and methods are set forth in detail in conjunction with the accompanying drawings.

Referring to the drawings.

In general, my registration board consists of a sheet of substantially transparent material which is dimensionally stable and which is large enough to contain the largest plate of photosensitized material used in the plant. The sheet of material is provided with a series of precisely punched, equally spaced holes on each side of the four sides of the sheet of material adjacent the outer margin thereof. A plurality of pins are mounted in the holes in the sheet of material and are positioned in accordance with the work to be performed. Such a pin registration board is particularly useful for stripping and for plate making to provide a precise method for performing very accurate work very rapidly.

Figures 1, 2:
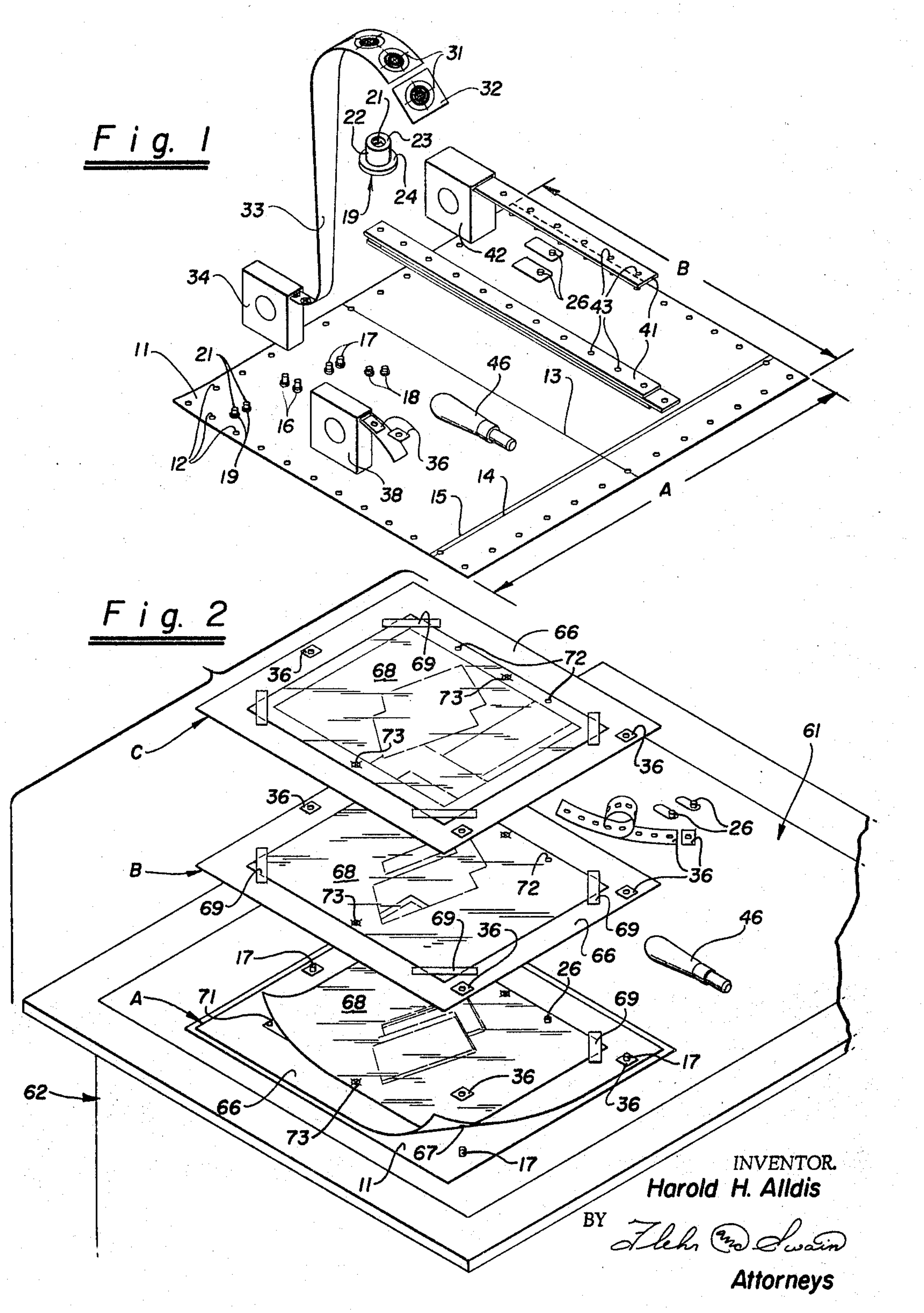
FIGURE 1 is an isometric view of my registration board and other accessories for use in performing my method.
FIGURE 2 is a perspective view showing the use of my pin registration board over a light table and method for stripping for mechanical registration.

As shown in FIGURE 1, my registration board is comprised of a sheet of substantially transparent material 11, and preferably, my registration board should be formed of material which is dimensionally stable, that is, does not change its dimensions substantially with changes in temperature and humidity. One material found to be particularly suitable is "Mylar" because it has great strength, is relatively transparent, and also is relatively stable dimension-wise with temperature and humidity changes. It should have a suitable thickness such as .010 inch so that it is relatively light and flexible. The sheet of material can be of any desired shape but preferably is in the form of a rectangle having four sides and four right angles as shown.

My pin registration board is provided with a plurality of precisely dimensioned holes 12 of a suitable diameter such as one-fourth of an inch which are punched into the outer margins of the sheet of material adjacent at least two of the sides edges of the sheet of material and preferably adjacent all four side edges of the sheet of material as shown in FIGURE 1. The holes can be punched into the sheet 11 in a suitable manner such as by the registration punch disclosed in my copending application Serial No. 120,028, filed June 27, 1961, now U.S. Patent No. 3,152,505. The holes can be spaced any suitable distance apart such as the two-inch spacing shown in the drawing. Preferably, the holes are equally spaced and on even numbered inches or dimensions of length. As shown in the drawings, the holes are numbered to indicate inches from center and from the gripper edge towards the rear. The holes are precisely spaced on the sheet of material so that they are at least within ±.001 of an inch within the desired spacing and form a perfect rectangle. The boards are formed so that they are exact duplicates. This makes it possible to flop and rotate the boards with respect to each other and still retain perfect alignment of the holes. As will be apparent hereinafter, this exact alignment and squareness of the holes are particularly important to the stripper because they permit the stripper to work the front and the back of a large page lay-out without having to flop either the pin registration board or the lay-out master sheet. As also explained hereinafter, this exact alignment and squareness simplify the preparation and control of step and repeat work.

The pin registration board can be of any suitable size ranging from 8 x 11 to 45 x 76. For example, one size of pin registration board which I have found to be particularly satisfactory is the 17 x 22 size which is shown in FIGURE 1 of the drawings. Thus, the A dimension across the board is 25 inches and the B dimension indicating the distance from the gripper edge or the forward edge to the rear edge of the board is 23 inches. As hereinafter described, the light table which is to be used with the pin registration board must be large enough to accommodate the size chosen and also the rubber seal within the vacuum frame must be large enough to accommodate the size chosen. The actual work area on my pin registration board is the area within the holes 12 and is 23¾ inches by 21¾ inches. The 17 x 22 size indicated for the pin registration board is the size of the plate which can be readily accommodated by this pin registration board as hereinafter shown. It is readily apparent that, if desired, larger or smaller pin registration boards can be provided without difficulty. The boards also can be provided with holes which are spaced one inch apart rather than two inches, or even one-half inch apart, if desired.

A centerline 13 is scribed on the pin registration board as shown. This centerline, as hereinafter described, is very useful in almost every job which is to be stripped because, as is well known to those skilled in the art, the jobs must be established on centers and a line already accurately and permanently placed in the pin registration board saves considerable time.

It will be noted that the holes 12 have been provided with numbers and that the holes of the horizontal rows of holes in alignment with the centerline 13 are identified as zero holes. The holes on the opposite side of these zero holes on the gripper and rear edges are identified by the numbers 2, 4, 6, 8, 10 and 12 to indicate the number of inches the holes are positioned from the centerline. Of particular importance are the 10 inch holes which are spaced 20 inches apart. As hereinafter explained, these holes are utilized for performing a large percentage of the work to be performed with my pin registration board.

A horizontal line 14 may also be scribed onto my pin registration board. This line 14 indicates the greatest image or sheet layback which may be demanded by any press utilized with the pin registration board. This distance is measured from a line which is coincident with the inner edges of the horizontal row of holes 11 positioned adjacent the gripper edge and upwardly or back from the gripper edge. A typical distance is 2¼ inches and indicates the sheet layback or plate margin. Another line 15 parallel to the line 14 is spaced upwardly a slight distance from the line 14 and indicates the gripper margin for a particular press. If another press should have a smaller gripper margin, then another line closely paralleling line 15 would have to be provided. If necessary, other lines could also be provided for other presses. However, the line 14 would always indicate the common sheet edge line and all markings on the pin registration board would be with reference to this line. As hereinafter described, when my pin registration board is utilized for plate making, plate stops are also provided on the board.

Three sizes of registration pins are shown in FIGURE 1 for use with my pin registration board. Long pins 16 are used in punching art illustration board for use with overlays. Medium pins 17 are used on the stripping bench and permit a stripper to pile several flats on top of the registration board without danger of the top flat slipping off while checking color registration or fit. Short pins 18 are used for vacuum frame registration when it is desirable to expose only one flat at a time in order to achieve excellent contact between the plate and the mask. Special pins 19 are provided which have internally threaded holes 21 which are adapted to receive machine bolts to facilitate securing of the registration board to copy boards, plate sinks, etc., where it is desired to hold the materials in exact steady position.

As can be seen in the drawing, all of the pins are substantially similar in their general configuration in that they are provided with a cylindrical body 22 having a flat upper surface 23 and a radially extending flange 24 extending from the lower part of the body 22. The pins are formed so that the bodies are approximately .001 of an inch oversize with respect to the holes 12 in the sheet 11 so that when the pins are pressed into the holes, they are frictionally retained within the sheet. If desired, the pins can be inserted in tabs 26 to provide pin tabs as shown in FIGURE 1. The tabs are each provided with a hole punched in one end and in which the pin has been inserted and held in place by a suitable material such as masking tape (not shown) placed over the bottom of the pin. These tabs facilitate placing the pins within the holes 12 provided within the registration board 11 as hereinafter described.

Cross marks 31 carried on small squares 32 of a suitable material such as paper with pressure-sensitive backing are provided in strips 33 which are carried within suitable roll type dispensers 34 for use with my registration board. As shown in the drawing, the cross marks 31 are provided with positive and negative elements or, in other words, black and white portions for registration purposes in both positive and negative forms. The cross marks are separately detachable as shown in FIGURE 1.

Hole strengtheners 36 of suitable material such as .005″ "Mylar" are also provided in strip form and are carried within a suitable dispenser 38. The hole strengtheners 36 and the cross marks 31 are provided with a suitable pressure sensitive sticky coating on the back sides thereof so that they can be readily applied to the various materials used in my method.

A plurality of control strips 41 are also provided as shown in FIGURE 1. The control strips are formed of a suitable material such as .001 inch "Mylar". The strips can be provided in roll form mounted in convenient dispensers 42. The strips can be of any suitable length and width. For example, they can have a width of 1½ inches and a length of 100 feet. It is preferable that the strips have a substantial width so that they will not have a tendency to curve or waver during use. It is well known that if the strip is too narrow, it is difficult for the strip to assume and retain a straight line position. The strips are provided with precisely spaced holes 43 of the same diameter as the holes 12 provided in the registration board. The holes in the different strips have different spacings. Generally, it is desirable to provide eight separate strips with different spacings between the holes in the strips. Thus, it would be desirable to space the holes in one of the strips 15/16 of an inch apart; the holes in another strip 14/16 of an inch apart; and the holes in the other strip 13/16 of an inch apart down to ½ or 8/16 of an inch. These strips can be supplied pre-punched or they can be punched with a punch as described in my copending application Serial No. 120,028, filed June 27, 1961. The use of these strips in performing my method in a subtractive or additive manner is hereinafter described.

Also shown in FIGURE 1 is a hand twist punch 46 for punching over-size holes so that masking material can be made free of the control register pins until hole strengtheners are positioned on the masking material.

Certain of the accessories which are shown in FIGURE 1, such as the pins 19, the hole strengtheners 36, the tabs 26 and the cross marks 31, are particularly useful in the art and camera departments of a lithography plant or graphic arts establishment. However, it is in the stripping departments and plate making departments that my pin registration board is particularly useful.

*Use of pin registration board for stripping*

The use of my pin registration board and method in the stripping department is shown particularly in FIGURE 2. As shown therein, my pin registration board and method is designed for use with a stripper's light table 62 which is provided with a glass surface 61 through which the light shines. Such light tables are well known to those skilled in the art and are conventional.

In using my pin registration board and method in the stripping department, the pin registration board 11 is squared on the light table by suitable means such as a T-square which engages the pins in the board. At least three medium control pins 17 are placed in the registration board. For example, as shown in FIGURE 2, two of the pins 17 are placed on the opposite portions of the registration board adjacent the lower edge, whereas the third pin 17 is placed in the upper end of the registration board substantially equi-distant from the side edges of the registration board. A sheet 66 of suitable masking material such as the conventional "Goldenrod" is placed over the pin registration board. The hand is brushed over the masking material so the pins 17 will emboss the masking material. Two holes corresponding to the lower pins 17 are placed in the masking material by the hand twist drill 46. The hand twist drill provides holes 67 in the masking material which are slightly greater than the diameter of the pins 17. This is done so that when the masking paper is placed over the pins, the paper will lie perfectly flat with no twisting or tension created in the paper. Hole strengtheners 36 are then placed over the pins and slid into contact with the masking paper 66. The third hole 67 for the top pin 17 is placed in the masking material in a similar manner and a hole strengthener 36 is placed over the pin 17 to engage the masking paper. The pins 17 provide a three-point control to firmly hold the masking paper in place. In this manner, the masking paper 66 will be held rigidly without tension in any one direction.

Assuming that a three-color burn is contemplated, two additional masking sheets 66 are prepared in the same manner. A negative 68 is applied to each of the masking sheets 66 to provide an assembly which is commonly called a "flat" or a "masked negative". The three flats are identified as A, B and C, respectively. Assuming that the three colors are to be black, green and tan, the negative 68 for the first color "black" is properly positioned onto the sheet 66 and secured thereto by tape strips 69. The masking material underlying the negative is cut away by suitable means such as a razor blade to provide a cut-out 71. Tab-mounted pins 26 are inserted in the pre-punched camera negative holes 72 provided in the negative. The second sheet 66 is then placed over the flat A on the pins 17 so that the holes 67 slide over the pins 17. Thereafter, the masking paper 66 is drilled with the hand twist drill 46 to provide two holes to receive the pins 26 in the negative below. The negative 68 for the second color "green" is then slipped over the pins 26 and taped securely in place on the masking paper 66 to provide the second flat B. The masking material underlying the negative is then cut away.

The third flat sheet 66 is then placed on the pins 17 in a manner similar to the second sheet 66. The third negative 68 for the color "tan" is placed over the pins 26 and securely taped into place on the masking paper 66 to form the third flat C.

The flats A, B and C are now ready for use in performing multiple burns to provide different shades of one color, i.e. line black, screen black and one-half tone black when one color is used, or to provide three different colors, i.e. the black, green and tan indicated when different colors are used. As hereinafter explained, these flats are now ready for use in the plate making department.

In place of the pins 26 which are adapted to be mounted in the holes 72 provided in the negatives, cross marks 73 can be provided which are visible through the various negatives so that visual registration can be made of the negatives before they are taped into place. This is not necessary when the pins 26 are utilized. However, these cross marks provide an additional check to be sure that the registration is accurate. The use of mechanical registration provided by the pins replaces the visual interpretation of the cross marks by the stripper and, in addition, gives greater accuracy and consistency of results. The use of the pin registration board greatly increases the skill and efficiency of the average craftsman and particularly when preparing jobs requiring two or three exposures such as when multiple colors are utilized or when preparing jobs requiring hairline registration. My pin registration board and method is also particularly adapted for jobs which involve multiple images or step and repeat work on presensitized plates or unexposed films as hereinafter described. In preparing multi-color jobs or multi-burn jobs, it is a simple matter to maintain absolute control of each flat at all times and through each stage in the lithographic plant by the use of my pin registration board even though the work passes from one workman to another as from the stripping department to the plate-making department. This is possible because the numbers on the pin board establish a common language upon which instructions for the positioning of various elements either in stepping or in multiple exposure.

*Use of pin registration board for plate-making*

Figures 3, 4, 5:
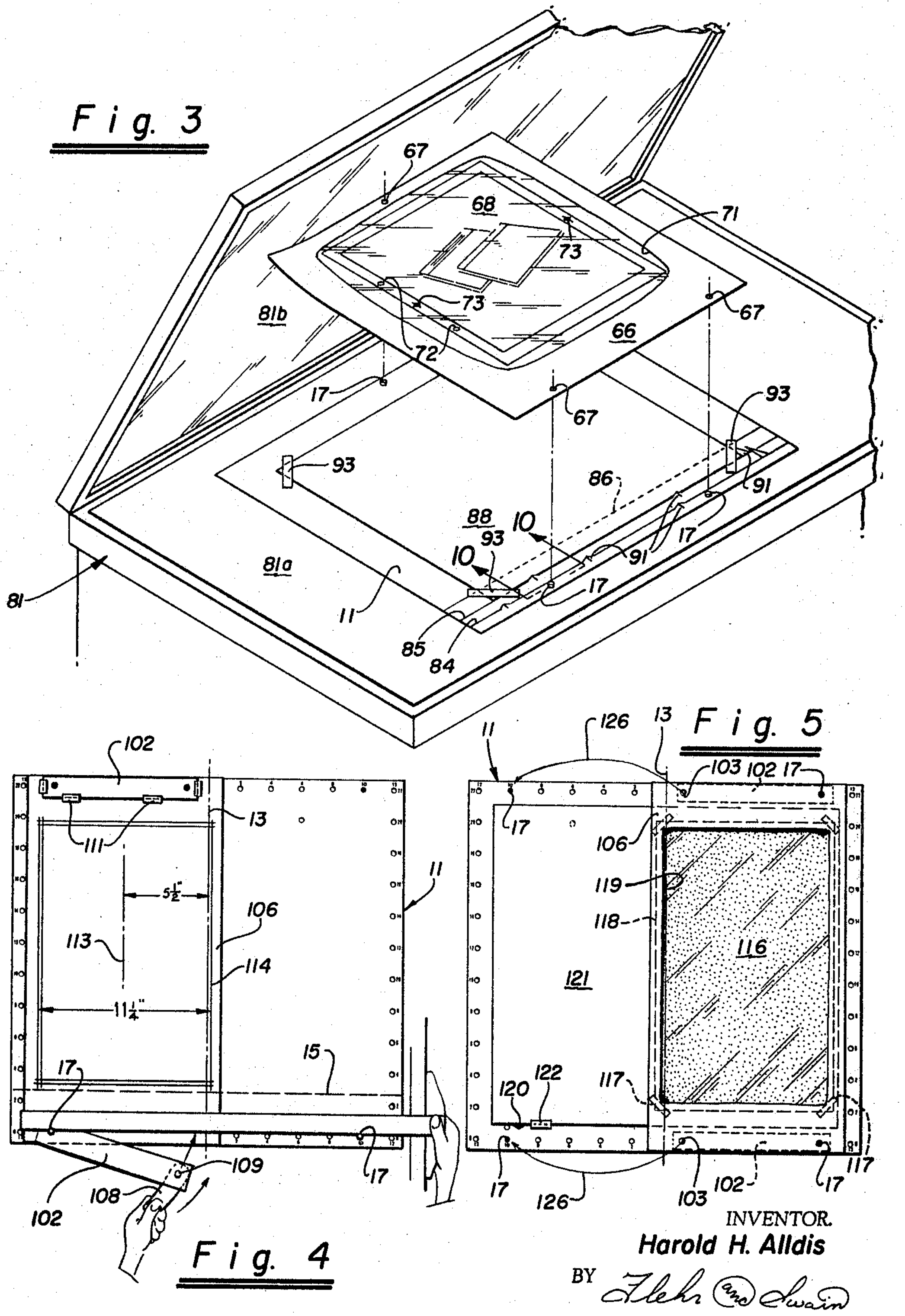
FIGURE 3 is a perspective view showing the use of my pin registration board in a vacuum frame and method for plate making.
FIGURE 4 is a plan view showing the use of my pin registration board for preparing a mask for two side steps.
FIGURE 5 is a perspective view showing the use of my pin registration board for making two side steps utilizing the mask which has been prepared in FIGURE 4.

The use of my pin registration board and method for plate-making is shown particularly in FIGURE 3. As shown in the drawing, my pin registration board is placed in a vacuum frame 81 of conventional construction. The pin registration board is provided with three pins 17 which are in precisely the same position as the pins 17 in the pin registration board of the stripper in the stripping department. The pin registration board 11 is provided with a common sheet edge line 15 and plate leading edge lines 84 and 85 which extend across the pin registration board along the lower edge thereof as shown in FIGURE 3. The line 84 represents what is called the 29 inch plate edge line and indicates the position at which a plate 88 of the 29 inch size would have to be positioned so that its common sheet line 86 will correspond to the common sheet line 15 provided on the pin registration board 11. The line 85 represents the line to which the plate edge must be positioned when it is of the 20 or 22 inch size that its common sheet line will correspond to the common sheet line 15 provided on the pin registration board.

In order to facilitate placement of the plates on the pin registration board, the pin registration board is provided with raised portions or stops 91 which are provided as a part of the board adjacent the plate edge lines 84 and 85, and the right side of the board serves as front side guides for the plates. The plate 88 is of a type well known to those skilled in the art and is generally of aluminum provided with a photosensitive coating. After the plate has been positioned adjacent the stops 91, it is fixed in position by strips of tape 93 as shown in FIGURE 3.

After the plate 88 has been properly positioned, the flat is taken from the stripper and placed over the front and rear pins 17 to provide a three-point control for the flat A. Thereafter, the cover of the vacuum frame is closed and the vacuum applied to achieve intimate contact between the negative 68 and the plate 88. The plate 88 is then exposed in a conventional manner by exposing it and the negative to a carbon arc light. After exposure, the flat and plate are removed, and the next plate for the next color is placed on the pin registration board, after which flat B is placed on the pins and the plate exposed in a similar manner. The same sequence of operation takes place for flat C to provide a set of three exposed color plates on which the images are exactly positioned on each plate to provide precise registration of the colors when they are printed.

This same procedure can be used for different shades of one color. Flat A could thus represent the line black exposure; flat B, a 10% screen black; and flat C, a 50% screen black. All three of these flats can be exposed simultaneously on the same plate to provide a screen and line combination or a multiple exposure plate.

Since the images on the plates are positioned so precisely, there is little "make-ready" time required on the press. This means it is possible to eliminate the necessity of rotating the cylinder or shifting the side guides of the press. The multiple exposures and step-and-repeat operations no longer present any problem to the plate maker because of the exact registration obtained. The use of substantially identical registration boards by the stripper and the plate maker in which the boards have the identical pin locations eliminates the possibility of mis-registration through visual misinterpretation of registration marks. The mechanical process used to locate the plate in the proper relation to the gripper and centerline of the press greatly assists the pressman and reduces the time required for setting of the press.

*Use of pin registration board for controlling steps*

Use of my pin registration board for controlling steps is shown in FIGURES 4–9. As explained previously, much of the work in a conventional lithography shop can be accomplished with what I have termed a 20 inch pin system in which the register pins are spaced 10 inches on either side of the centerline or 20 inches apart on the pin registration board. The advantage of such a system is that it makes it possible to use the spacing provided by the three-hole punch described in my copending application Serial No. 120,026, filed June 27, 1961, now U.S. Pat. No. 3,164,050, so that pre-punched films and other materials can be readily coordinated in my system. In addition, the pins used can be securely taped into position since they seldom need be removed to other locations except in unusual jobs requiring four or five steps or more.

Let it be assumed that it is desired to perform two side steps with my pin registration board as shown in FIGURES 4 and 5. The pins 17 are spaced 20 inches apart on the front and rear edges of the pin registration board 11 as shown in FIGURE 4. Assuming the desired step is 11¼ inches, which is less than 20 inches (the board control distance), the difference between 11¼ inches and 20 inches is punched into a pair of mask control strips 102 by punching holes 103 on opposite ends of the strips and having their centers separated by this distance.

As soon as the two mask control strips 102 have been punched with properly spaced holes 103, a piece of masking material 106 of a suitable type such as "Goldenrod" hereinbefore mentioned, which is large enough to extend over the pins 17 on the left-hand side of the pin registration board and beyond the center 13 of the board is placed over the left-hand side of the pin registration board, over the two left-hand pins 17. Holes are then punched in the masking material by the hand twist drill so that the masking material 106 fits loosely over the two left-hand pins 17. The two mask control strips are then mounted on the pins 17 so that the left-hand holes 103 provided in the mask control strips are mounted over the left-hand pins 17 provided in the pin registration board. Pin tabs 108 are then inserted in the other hole 103 of each of the mask control strips. Then, by utilizing a T-square or similar means, the pins 109 carried by the pin tab 108 are aligned with the pins 17, as shown in FIGURE 4, after which the mask control strips are affixed to the masking material by suitable means such as strips of tape 111, after which the pin tabs 108 have been removed.

As soon as the mask control strips have been affixed to the masking material 106, the masking material is completely under control for use on my pin registration board.

Once the masking material is "under control" by being positioned on the pins 17, the negative may be postioned. The pin registeration board has a centerline 13 which can be seen through the masking sheet when the masking sheet and registration board are on the light table. The trim line or edge of image line 114 is placed on the centerline 13 of the board so that when a side step is made, the trim or edge lines adjoin each other. The lay-back position of the negative or image is marked out by measuring back up from the common sheet edge line 15. When the negative or image has been positioned according to the centerline and the lay-back from the common sheet edge line 15, it is taped down so that it is ready for stepping. As shown, the negative is held in the proper position by transparent tape pieces 117 applied to the corners of the negative. The outer margin of the negative is indicated by the dot-dash line 118 shown in FIGURE 5. After the negative has been properly positioned, the masking material lying below the portion of the image of the negative to be exposed is cut away by suitable means such as a razor blade to provide a substantially rectangular cutout 119 as shown in FIGURE 5.

The plate maker now takes another pin registration board 11 as shown in FIGURE 5 and places it on the vacuum frame in a manner similar to that hereinbefore described in FIGURE 3. A plate 121 having a photosensitive surface is then affixed to the pin registration board in a proper position and is held thereto by pieces of tape 122. This pin registration board is identical to the pin registration board shown in FIGURE 4 and is provided with pins 17 which are spaced in an identical manner. It is also provided with stops 120 of the type hereinbefore described to facilitate positioning of the plate 121. After the plate 121 has been fixed, the mask or flat bearing the negative 116 is flipped over or turned over so that the mask control strips underlie the masking material as shown in FIGURE 5 and the right-hand holes 103 in the mask control strips 102 are placed over the right-hand pins 17 of the pin registration board as shown in FIGURE 5.

The portion of the plate 121 which is not covered by the mask 106 is covered with other scraps of masking material while the image in the negative 116 is being exposed. The second exposure is made by moving the flat to the left side as indicated by the arrows 126 in FIGURE 5 so that the left-hand holes 103 in the mask control strips are placed over the left-hand pins 17 provided in the pin registration board. During the time this exposure is made, the right-hand side of the plate 121, which is not covered by the flat or mask carrying the negative 116, is covered with scraps of masking material.

From the foregoing, it can be seen that the flat is continuously under the control of the mask control strips 102 and that the image carried by the flat is always in proper registration with the plate 121 upon which the exposure is being made.

When utilizing my pin registration board and method for three side steps, it is necessary to utilize a center pin as well as the pins on the ends to provide three sets of control points at the front and rear of the pin registration board. For example, if it is desired to step $6^{13}/_{16}$ inches successively in three separate steps, it is necessary to subtract this distance of $6^{13}/_{16}$ of an inch from the center or first position to the second position which can be on either side of the center pin. In either event, this distance is equal to one-half of 20 inches assuming the 20 inch spacing is utilized to give 10 inches. Then, $6^{13}/_{16}$ inches is substracted from 10 inches to give $3^{3}/_{16}$ inches. The mask control strips in such a situation are then punched with three holes, each spaced $3^{13}/_{16}$ inches apart. These mask control strips are mounted on the masking material in the same manner as hereinbefore described for the two-step procedure and utilized for controlling the mask or flat as it is shifted from the center hole of the mask to the hole on either side of the center hole of the mask in cooperation with the three pins provided on each of the front and rear of the registration board. Each time the flat is shifted, it is shifted 10 inches minus $3^{3}/_{16}$ inches to give a precisely controlled step of $6^{13}/_{16}$ inches.

Although I have described the use of my pin registration board and method in conjunction with side steps, it is readily apparent that, if desired, the same pin registration board and method can be utilized for performing vertical steps or, in other words, steps back on the board.

It should be pointed out that with this system, while making any one of the steps of exposures, a second exposure or combination exposure can be made at the same time, i.e., while the line negative is being exposed on the right side of the plate, it is possible to expose a half-tone or a second exposure on the left side of the plate and then reverse these positions for the second step and exposure.

Generally, if more than three steps are required, it is more convenient to simply remove the pins 17 from their 20 inch positions and place them according to the number of steps required. The pin positions are easily computed by taking the total number of inches between the extreme points. For example, assuming that the 24 inch board is utilized, the total spacing would be 24 inches. To divide this distance into a number of equal spaces, it is only necessary to take the total number of steps required, i.e., four steps, subtract one, and divide the remaining number (3) into the total distance of 24 inches to provide three equal divisions and four control points. With the three divisions, the distance between pins would be 8 inches to provide control points at the 0, 8, 16 and 24 inch points, or at the 12, 4, 4 and 12 inch points where the board is marked from the center. It should be noted that certain divisions are not divisible into 24 inches and, therefore, a lesser number should be used. For example, where 5 divisions are required, the largest usable number with a 24 inch board into which 5 is divisible is 20 inches to give 4 inches between control points which would be at the 10, 6, 2, 2, 6 and 10 inch points. With 9 divisions required, 18 inches would be utilized; with 10 divisions, 20 inches; with 11 divisions, 22 inches, and so forth. With 7 required divisions, the pin registration board should be punched for every inch and then 21 inches could be utilized. However, as hereinafter pointed out, in such situations, it is better to use board control strips.

Figures 6, 7, 10:
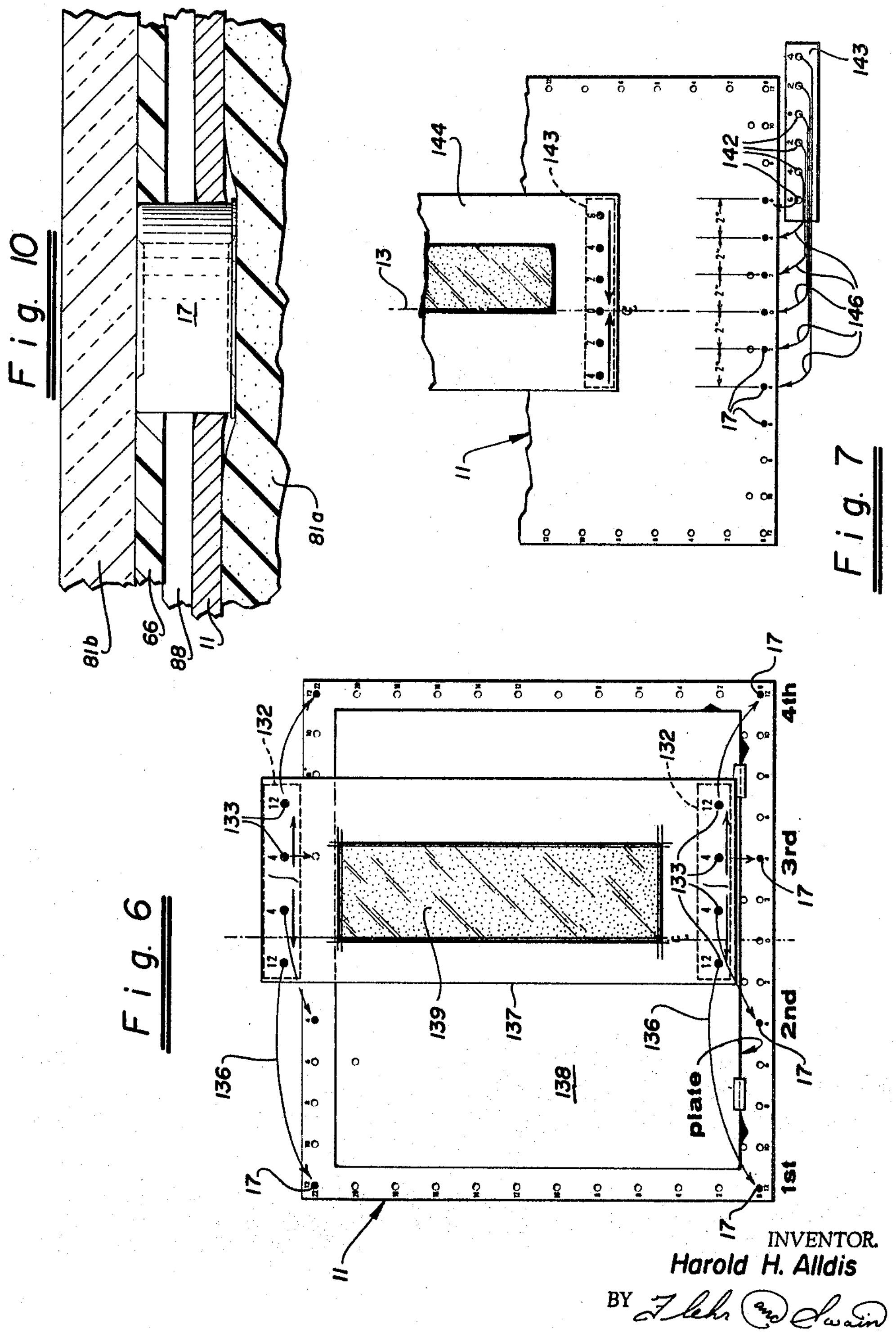
FIGURE 6 is a plan view showing the use of my pin registration board for performing four side steps.
FIGURE 7 is a partial plan view showing the use of my pin registration board for performing six side steps.
FIGURE 10 is a cross-sectional view taken along the line 10—10 of FIGURE 3.

Let it be assumed that it is desired to step 5½ inches in 4 separate steps as shown in FIGURE 6. Subtracting the 5½ inches from the 8 inches available leaves 2½ inches. It is this spacing which is used for the mask control strips 132 which are provided with four holes 133 which are spaced 2½ inches apart as shown in FIGURE 6. It will be noted that the holes in the mask control strips 132 have been numbered so that they correspond with the associated control points of the pin registration board. Arrows 136 have been used for indicating whether the numbered holes are associated with the left or right-hand side of the board. Thus, the left-hand holes 133 bearing the number 12 in the mask control strips are associated with the left-hand pins 17 marked 12 to provide proper positioning for the first exposure.

The mask control strips 132 form a part of the flat 137 in the same manner as described in conjunction with FIGURES 4 and 5. A photosensitive plate 138 is mounted on the pin registration board 11 in a manner identical to that hereinbefore described.

After the first exposure has been completed, the second exposure is made by placing holes identified as #4 in the flat with the pins identified as #4 in the left-hand side of the pin registration board. The third and fourth exposures are made in a similar manner. It should be pointed out that the negative 139 carried by the flat 137 is positioned so that at the four inch position of the mask, the work or trim line falls exactly on the centerline of the pin registration board and the common sheet edge line.

The same method is utilized for additional steps. For example, with five steps, the board is divided into four spacings of 6 inches width. With a 4½ inch step, the mask control strip would be punched with holes 1½ inches apart. To provide six side steps, the pin registration board is divided into five equal sections. This can be accomplished by using the 20 inch overall spacing to provide a spacing between pins of 4 inches. Then assuming that the steps are 3½ inches, the mask control strips are punched with holes one-half inch apart. The stepping system thus far described can be called a subtractive system because the spacing between the holes in the mask control strips is subtracted from the spacing provided between the pins.

Now let it be assumed that it is desired to provide six steps with 3¾ inches for each step. Dividing this into the conventional 24 inch board provides a spacing of 4 inches between pins. However, subtracting 3¾ inches from 4 inches leaves only one-fourth inch spacing between the centers of the holes which, since the holes themselves are one-fourth inch in diameter, leaves no material between the holes. Thus, in this situation or in any situation in which the holes are closer than one-half inch, it is desirable to utilize the additive system of stepping rather than the subtractive system hereinbefore described.

Thus, as shown in FIGURE 7, the pins 17 are spaced 2 inches apart rather than 4 inches apart. It will be noted that two pins have been placed to the left of the zero or centerline 13 and that three pins have been placed to the right of the centerline 13. This is necessary because the pin registration board shown in FIGURE 7 is punched every 2 inches rather than every one inch. If a board having holes punched every one inch were used, the pins would be symmetrical about the centerline. However, since this is not the case when the pin registration board is punched with 2 inch spacings, more pins must be placed on one side than the other. Since the additive system is being utilized, the 2 inch spacing is subtracted from the desired step distance to give a length of 1¾ inches. Thus, the holes 142 in the mask control strip 143 are punched 1¾ inches apart. The mask control strip 143 forms a part of the flat 144 as shown. Since the mask control strips 143 are off-center to the right, the negative is positioned to the right of the center while the mask is zeroed on the pin registration board. The flat 144 is stepped as indicated by the arrows 146 in FIGURE 7.

Figure 8:
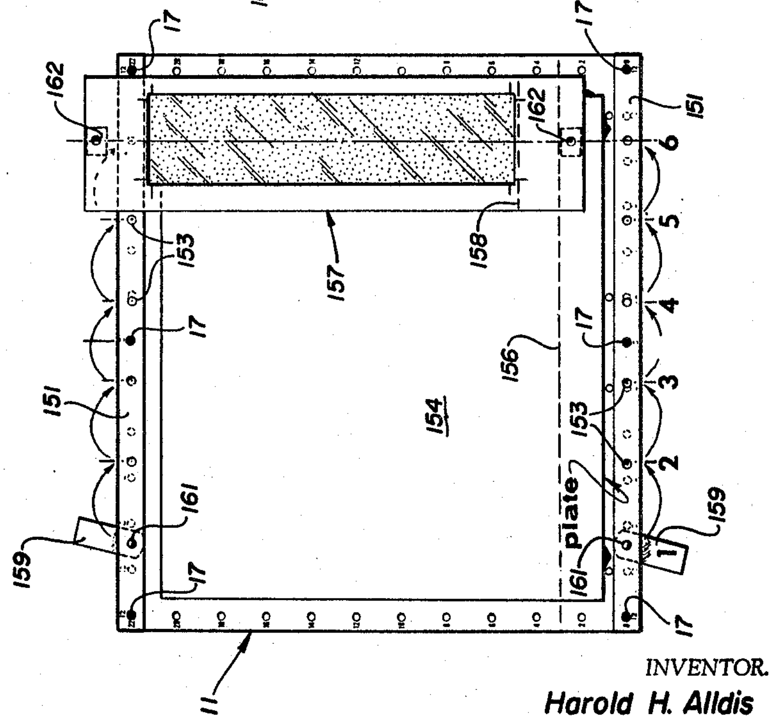
FIGURE 8 is a plan view showing the use of my pin registration board for performing six side steps using board control strips.

From the foregoing, it can be seen that either a subtractive system or an additive system can be utilized in stepping without difficulty. However, as hereinbefore explained, at times it may be preferable to use board control strips when there are four or more steps, and particularly so if it is a distance and a number of steps which are commonly used because these board control strips can be stored away and reused. In FIGURE 8, I have shown the use of board control strips 151 for performing side steps. The board control strips 151 are first punched with three holes which correspond to the control points 12, 12 and zero provided on the pin registration board and in which are mounted the pins 17.

In punching these positions in the board control strips, it is advisable to first punch the zero hole and then punch the two outside 12 inch control points. In punching these outer positions, it is desirable to make the distance a thousandth or two less than actually what it should be so that when the board control strip is snapped onto the pins mounted in the pin registration board, there will be no slack. This doubly assures that when the pin registration board and the board control strips are under the pressure in the vacuum frame, there will not be any slack or possible shift in the board control strips.

The board control strips are provided with holes 153 which are spaced in accordance with the desired number of steps. For example, as shown, the board control strips 151 are provided with six holes 153 to provide six step control points which are spaced a suitable distance apart such as 3¾ inches. It will be noted that the holes 153 are spaced so that they center about the central control point provided for the board control strips. This is desirable because the center pins 17 provide an additional control point for the board control strips. When an odd number of steps is required, the center board control point is also utilized as a step control point which is not the case when an even number of steps is required. However, in either event, the board control strips are firmly held in position in a straight line at three points.

A plate 154 is mounted on the pin registration board in the same manner as hereinbefore described. It is provided with a common sheet edge line 156 from which any work is positioned. A flat 157 is provided with a similar edge line 158. Pin tabs 159 are provided at the upper and lower extremities of the pin registration board and are provided with pins 161 which are adapted to be positioned in the holes 153 provided in the board control strips 151.

The flat 157 is provided with holes 162 which are centered in the front and rear margins of the flat and which are adapted to be mounted over the pins 161 carried by the pin tabs 159. In making the first exposure, the flat 157 is positioned over the pins 161 when they are in the left-hand holes of the board control strips 151 as shown. The portion of the plate 154 which is not covered by the flat 157 is covered with masking paper. After the exposure has been made, the pin tabs 159 are moved to the next holes to the right in the board control strips 151 and the flat 157 positioned on the pins, and the second exposure is made. The same sequence of operation takes place until all six steps have been completed.

If, in the future, it is believed that similar work with the same distances and number of steps will be done, the board control strips 151 can be filed away for later use. It is readily apparent that similar board control strips can be utilized for vertical stepping as well as the sidewise stepping hereinbefore described.

Now let it be assumed that it is desired to step back as well as to step across my pin registration board. This is accomplished by the use of board control strips and cross control strips. For example, let it be assumed that it is desired to step five steps back and five steps across on the plate to be exposed to provide 25 images. To step five steps down or back is accomplished by providing board control strips 166. These board control strips 166 are provided with three holes 167 designated by the zero, 12 and 22 inch positions on the pin registration board and in which are disposed pins 17 of the pin registration board to provide three control points for each strip. In stepping back on the plate 168 mounted on the pin registration board 11, it is not necessary to work back from an exact center point. The 12 inch position provides the center control for the board control strips. This 12 inch point also becomes one of the actual steps. Since it is desired to provide five separate steps, two holes are provided on each side of the 12 inch position spaced 3¼ inches apart to provide four spaces 3¼ inches apart or five steps. Pin tabs 172 are provided and are adapted to be inserted in the holes 171 provided in the board control strips.

Figure 9:
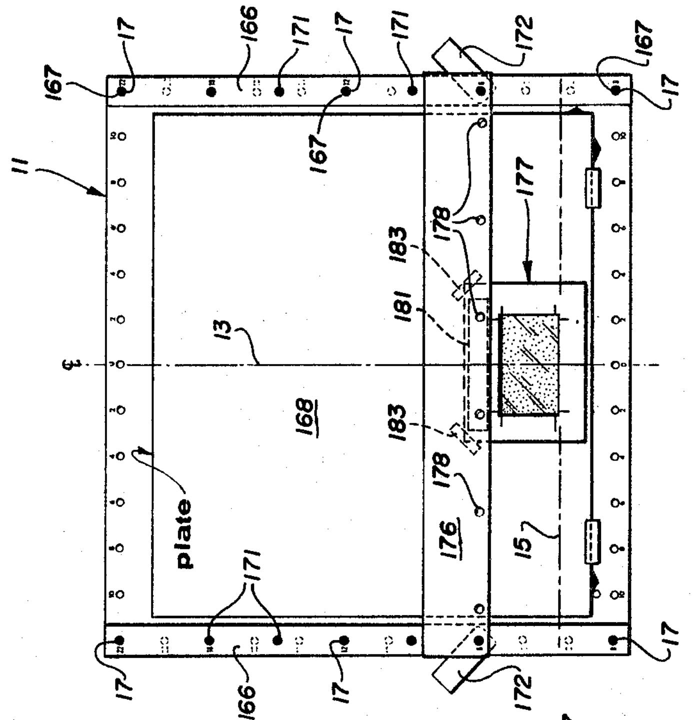
FIGURE 9 is a plan view showing the use of my pin registration board for performing five steps back and five steps across using board control strips and cross control strips.

A cross control strip 176 is prepared in much the same manner as a board control strip. Let it be assumed that 4¼ inch spacing is desired for the flat 177. If such is the case, holes 178 are punched in the cross control strip on opposite sides of the centerline 13, 2⅛ inches from the centerline, to provide a spacing between the holes of 4¼ inches. Two additional holes 178 are provided in the cross control strip spaced 4¼ inches on both sides from the other holes. Also, a mask control strip 181 is provided in which are punched holes also spaced 4¼ inches apart. This strip 181 forms a part of the flat 177 as shown in FIGURE 9 and gives dimensional stability.

With the pin tabs 172 inserted in the first exposure position of the board control strips, the cross control strip 176 is positioned in this first exposure position. The mask control strip 181 carrying the flat 177 is located on the center control points of the cross control strip as shown in FIGURE 9 for the first exposure. It is from this position that the mask 177 can be punched and attached to the mask control strip 181. With the mask control strip 181 and the mask 177 in position, the basic lay-out lines of the center and the common sheet edge can be made on the masking paper in a manner similar to that hereinbefore described and the negative or image positioned accordingly.

The flat 177 is affixed to the cross control strip 176 first by placing pin tabs (not shown) into the holes 178 in the cross control strip and the two holes provided in the mask control strip 181. Then, the mask or flat 177 is affixed in position by utilizing pieces of tape 183. Thereafter, the pin tabs are removed. It is necessary to remove the pin tabs because it is difficult, if not impossible, to step across the metal plate 168 without embossing the light metal plate 168 when the vacuum is applied to the pin registration board in the vacuum table during exposure of the plate.

The steps are made by stepping the cross control strip 176 rearwardly or to the back by first making the exposure in the first position, then shifting the pin tabs 172 into the next hole in the board control strips 166, and then shifting the cross control strip 176. Of course, all of the area of the plate which is not covered by the mask 177 should be covered with sheets of masking material during the exposure of the image.

As soon as all five rearward steps have been completed, the cross control strip is removed and pin tabs are inserted into the next set of holes in the cross control strip and the flat 177 is moved and positioned on the pins. The flat is then again lightly taped into position and the pins removed, and the cross control strip is stepped back from the first position repeating to the fifth position. This same sequence of operation is continued until the flat 177 has been shifted to all five positions on the cross control strip and stepped rearwardly through the five positions to give a total of 25 exposures.

It should be pointed out that any combination of exposures can be made such as half-tone and line exposures by this method by merely allowing the line negative mask to follow the half-tone mask side-by-side.

It should be readily apparent to those skilled in the art that step and swing operations can be performed with my pin registration board and method without any difficulty and can be accomplished in either direction across the plate. However, in order to make this type of step, it is important that the work or trim lines of the image be on the exact center between the outside board control points or control strips if used. When using board control strips, it is also necessary to have the work and negative area stripped onto the mask so that its exact centerline goes through the exact center of the single pair of mask control holes. By swing, it is meant that the flat is turned end for end.

If it is desirable to eliminate the need of punching the board control strips, that is, it is undesirable to purchase a precision punch or to take the time for the preparation of the board control strips in the shop, it is possible to utilize the strips 43 shown in FIGURE 1 which are pre-punched with holes spaced apart specified predetermined distances. Assuming that the pin registration board was punched with holes one inch apart, all possible combinations could be provided by providing eight different types of punched strips having holes spaced from $15/16$ of an inch down to one-half of an inch apart. Using these prepunched strips with pins inserted where needed, any step one-half inch or less would use the additive method and any figure of $9/16$ inch or more would use the subtractive method. Thus, taking the example of a step of $3\,7/16$ inches, this would require placing or using the pins every four inches in the pin registration board and subtracting $3\,7/16$ inches from 4 inches which would leave $9/16$ of an inch. This would be the mask control strip spacing. The proper strip of material 43 with the proper spacing between holes would be chosen and then the piece would be cut off from the strip having a number of holes equal to the number of steps required. Thus, if six steps are required, a piece having six holes would be cut off from the strip and would be used for the mask control strip in the same manner as mask control strips have heretofore been utilized.

Now, if the step had been $3\,11/16$ inches rather than $3\,7/16$ inches, the additive system of stepping would be used and the pins would be placed at every three inches and mask control strips with the spacings of $11/16$ inch would be used. Thus, when moving from one pin to another on the pin registration board, the next hole in the mask control strip would be utilized to thus add $11/16$ inch at each step. The latter is the additive system, whereas the prior was the subtractive system. The use of such a mask control strip in an additive system is shown in FIGURE 7.

In FIGURE 10, I have shown how my pins 17 can easily recede into the resilient vacuum blanket 81*a* of the vacuum frame 81. This is facilitated by the fact that the pins are provided with very narrow flanges as shown particularly in FIGURE 10. The flanged and butt ends of the pins 17 have centrally located recesses as shown by the broken lines in FIGURE 10. These recesses help to ensure that the pins will seat squarely against the blanket 81*a* and the glass 81*b* of the vacuum frame because there are no raised center portions. Since the pins 17 are seated squarely, they will not bind in the sheets 66, 88 and 11 as they recede.

If desired the pins 17 can be provided with a central bore in place of the recesses. Bolts or screws can then be used in the bores to mount the pins onto vacuum backs or cameras and into plate sinks etc.

It is apparent from the foregoing that I have provided a pin registration board which makes it possible to obtain a degree of accuracy which can only be equalled by expensive layout tables or step-and-repeat machines. The pin registration board makes it feasible to provide a flexible system which makes it possible to coordinate the combined efforts of the art, camera, stripping and platemaking departments in a graphic arts establishment. The registration board makes possible a mechanical registration system which greatly reduces the possibility of human error. A perfect square or rectangle which can be utilized for consistent and duplicate spacing can be obtained by the use of the mask control strips or board control strips and cross control strips. The pin registration board gives a common sheet lay-out for all types of presses and gives exact horizontal and vertical positions. When utilized for multiple exposures of photosensitive materials, hairline accuracy can be obtained.

I claim:

1. In a method for preparing a photosensitive plate with multiple exposures thereon utilizing a substantially transparent, dimensionally stable mask forming a registration member having precisely positioned holes with a predetermined spacing between the same, adjacent opposite side edges of the member, a plurality of pins, a mask having an image carried thereby, and a pair of mask control strips, placing the photosensitive plate on the member and securing the same thereto, placing pins in the holes in the member so that there is a uniform predetermined spacing between the pins, placing at least a pair of spaced holes in each mask control strip, the spacing between the holes on each of the mask control strips being identical but being different from the spacing between the pins in the registration member, securing the mask control strips at spaced points on the mask so that the mask control strips can be positioned so that one of the pins on each of the said two sides of the member extends through one of the holes in one of the mask control strips whereby the mask control strips are retained by pins to precisely position the mask and the image carried thereby, successively positioning the mask bearing the image to be reproduced on the plate upon successive pins of the registration member utilizing successive holes of the mask control strips, and exposing the plate to the image after each step of the mask.

2. A method as in claim 1 wherein the spacing between the holes in the mask control strips is equal to the remainder when the desired step for the mask control strip is subtracted from the spacing between the pins on the registration member.

3. A method as in claim 1 wherein the distance between the holes in the mask control strips is equal to the remainder when the spacing between the pins on the registration member is subtracted from the desired step for the mask.

4. A method as in claim 1 wherein the precisely positioned holes are on opposite side edges of the registration member and wherein the mask control strips are positioned on opposite ends of the mask.

References Cited by the Examiner

UNITED STATES PATENTS

| | | | |
|---|---|---|---|
| 2,108,039 | 2/1938 | Betts | 96—43 X |
| 2,115,357 | 4/1938 | Bancroft | 33—184.5 |
| 2,481,928 | 9/1949 | Huebner | 33—184.5 |
| 2,499,100 | 2/1950 | Kessler. | |
| 2,701,196 | 2/1955 | Conrad | 96—30 |
| 2,711,031 | 6/1955 | Kessler. | |
| 2,975,694 | 3/1961 | Pell | 96—41 X |
| 3,000,737 | 9/1961 | Barnhardt. | |
| 3,037,862 | 6/1962 | Neth | 96—87 |

OTHER REFERENCES

Lithographer 3 and 2, Navy Training Courses, NAVPERS 10452, 1955, pages 345–346.

NORMAN G. TORCHIN, *Primary Examiner.*

DELBERT B. LOWE, *Examiner.*

J. R. BLOOM, R. L. STONE, R. H. SMITH, *Assistant Examiners.*